(12) United States Patent
Choudhary et al.

(10) Patent No.: US 9,207,935 B2
(45) Date of Patent: Dec. 8, 2015

(54) EARLY ANALYSIS OF SOFTWARE DESIGN DIAGRAMS

(75) Inventors: Naresh Balaram Choudhary, Bangalore (IN); Mursheid Khan, Bangalore (IN)

(73) Assignee: Infosys Limited, Bangalore (IN)

( * ) Notice: Subject to any disclaimer, the term of this patent is extended or adjusted under 35 U.S.C. 154(b) by 250 days.

(21) Appl. No.: 13/114,890

(22) Filed: May 24, 2011

(65) Prior Publication Data

US 2012/0260230 A1 Oct. 11, 2012

(30) Foreign Application Priority Data

Apr. 7, 2011 (IN) .............................. 1198CHE/2011

(51) Int. Cl.
*G06F 9/44* (2006.01)
*G06F 11/36* (2006.01)

(52) U.S. Cl.
CPC .............. *G06F 8/77* (2013.01); *G06F 11/3616* (2013.01); *G06F 8/35* (2013.01)

(58) Field of Classification Search
CPC .............. G06F 8/34; G06F 8/35; G06F 8/73; G06F 8/10; G06F 8/77; G06F 11/3616; G06Q 8/10; G06Q 10/06
USPC .................................................. 717/104, 105
See application file for complete search history.

(56) References Cited

U.S. PATENT DOCUMENTS

| | | | |
|---|---|---|---|
| 6,073,107 A * | 6/2000 | Minkiewicz et al. ........ 705/7.17 |
| 7,171,646 B2 * | 1/2007 | Charisius et al. ............. 717/100 |
| 7,286,546 B2 | 10/2007 | Mondal |
| 7,716,254 B2 | 5/2010 | Sarkar et al. |
| 7,912,695 B2 | 3/2011 | Krishnamurthy et al. |
| 2003/0212778 A1 * | 11/2003 | Collomb ....................... 709/223 |
| 2006/0174222 A1 | 8/2006 | Thonse et al. |
| 2007/0050343 A1 | 3/2007 | Siddaramappa et al. |
| 2008/0133212 A1 * | 6/2008 | Krishnamurthy et al. ...... 703/22 |
| 2008/0163164 A1 * | 7/2008 | Chowdhary et al. .......... 717/106 |
| 2009/0254876 A1 | 10/2009 | Kuriakose et al. |
| 2009/0254877 A1 | 10/2009 | Kuriakose et al. |
| 2009/0313599 A1 | 12/2009 | Doddavula et al. |
| 2010/0180256 A1 | 7/2010 | Gorthi et al. |
| 2011/0016452 A1 | 1/2011 | Gorthi et al. |
| 2011/0231828 A1 * | 9/2011 | Kaulgud et al. ............... 717/131 |
| 2012/0110545 A1 * | 5/2012 | Jerman et al. ................. 717/104 |

OTHER PUBLICATIONS

Basanieri et al., "An Automated Test Strategy Based on UML Diagrams," 9 pp. (also published in *Proc. of the Ericsson Rational User Conference*, Oct. 2001).

(Continued)

*Primary Examiner* — Anna Deng
(74) *Attorney, Agent, or Firm* — Klarquist Sparkman, LLP

(57) ABSTRACT

Methods, apparatus, and computer-readable media for analyzing the prospective quality of source code produced according to a class representation (e.g., a UML class diagram) are disclosed. According to one embodiment, a class-level representation of a software application is received, one or more object classes of the class-level representation are selected, and a number of quality metrics are calculated for the selected object classes. The quality metrics can be output as a report or used to modify object classes of the class representation to improve the prospective quality of source code produced according to the class representation.

19 Claims, 13 Drawing Sheets

(56) References Cited

OTHER PUBLICATIONS

Bell, "UML basics: The class diagram," downloaded from http://www.ibm.com/developerworks/rational/library/content/RationalEdge/sep04/bell/, (document dated Sep. 15, 2004, downloaded on Mar. 11, 2011), 16 pp.

Supaporn et al., "Automated-Generating Test Case Using UML Statechart Diagrams," *Proceedings of the South African Institute for Computer Scientists and Information Technologists* (SAICSIT), 2003, pp. 296-300.

Rao, "Tools for Design Quality Analysis," Software Tools @Infosys, downloaded from http://www.infosysblogs.com/softwaretools/2010/05/tools_for_design_quality_analy.html (document marked May 11, 2010, downloaded on Feb. 2, 2011), 3 pp.

Rational Software Corporation, "UML Notation Guide," version 1.1, Sep. 1, 1997, 148 pp.

Riebisch et al., "UML-Based Statistical Test Case Generation," 16 pp. (also published as Riebisch et al., "UML-Based Statistical Test Case Generation," in Objects, Components, Architectures, Services and Applications for a Networked World, Lecture Notes on Computer Science, vol. 2591, pp. 394411 (Aksit et al. eds., 2003)).

Shashank, "Comprehensive Software Quality," Software Tools@Infosys, downloaded from http://www.infosysblogs.com/softwaretools/2011/01/comprehensive_software_quality.html (document marked Jan. 31, 2011, downloaded on Feb. 2, 2011) 3 pp.

* cited by examiner

| Class Name | Class Level Violations | Method Level Violations | C_LOC | NOM | NoO | NOAM | MNOP | MNOL | DOI | HCC | WMC | CBO | RFC |
|---|---|---|---|---|---|---|---|---|---|---|---|---|---|
| BankAccount | 2 | 0 | 0.0 | 14 | 2 | 2 | 2 | 0 | 2 | 1 | 2 | 2 | 2 | 6 |
| CheckingAccount | 11 | 6 | 18.0 | 152 | 2 | 2 | 2 | 0 | 7 | 1 | 8 | 8 | 1 | 31 |
| SavingsAccount | 20 | 11 | 5.0 | 212 | 6 | 6 | 6 | 5 | 6 | 1 | 12 | 25 | 17 | 55 |
| RequestController | 2 | 5 | 11.0 | 94 | 2 | 2 | 2 | 1 | 3 | 1 | 9 | 9 | 7 | 20 |
| MasterEntity | 4 | 3 | 33.0 | 111 | 4 | 4 | 4 | 2 | 5 | 1 | 6 | 8 | 9 | 17 |
| AcPermission | 7 | 4 | 35.0 | 80 | 3 | 3 | 3 | 10 | 5 | 1 | 5 | 6 | 5 | 20 |
| DelegationBoundaryClass | 13 | 2 | 17.0 | 410 | 4 | 4 | 3 | 4 | 12 | 1 | 61 | 66 | 13 | 41 |
| BankingBoundary | 24 | 18 | 53.0 | 274 | 37 | 37 | 37 | 1 | 0 | 1 | 1 | 36 | 0 | 37 |
| DatabaseUpdateScheduler | 3 | 1 | 19.0 | 82 | 5 | 5 | 5 | 2 | 3 | 1 | 4 | 10 | 6 | 15 |
| ZipFolder | 11 | 10 | 24.0 | 91 | 4 | 4 | 4 | 2 | 4 | 1 | 7 | 15 | 10 | 26 |

FIG. 12B

| Class Name | Class Level Violations | Method Level Violations | C_LOC | NOM | NoO | NOAM | MNOP | MNOL | DOI | HCC | WMC | CBO | RFC |
|---|---|---|---|---|---|---|---|---|---|---|---|---|---|
| BankAccount | 2 | 0 | 0.0 | 14 | 2 | 2 | 2 | 0 | 2 | 1 | 2 | 2 | 2 | 6 |
| CheckingAccount | 11 | 6 | 25.0 | 152 | 2 | 2 | 2 | 0 | 7 | 1 | 8 | 8 | 14 | 33 |
| SavingsAccount | 20 | 11 | 35.0 | 200 | 16 | 9 | 7 | 3 | 3 | 1 | 10 | 25 | 12 | 52 |
| RequestController | 2 | 5 | 11.0 | 94 | 2 | 2 | 2 | 1 | 3 | 1 | 9 | 9 | 7 | 20 |
| MasterEntity | 4 | 3 | 33.0 | 120 | 14 | 16 | 17 | 3 | 4 | 1 | 6 | 8 | 9 | 17 |
| AcPermission | 2 | 4 | 35.0 | 80 | 3 | 3 | 3 | 10 | 4 | 1 | 5 | 6 | 5 | 20 |
| RequestBoundary | 13 | 7 | 17.0 | 410 | 4 | 4 | 4 | 4 | 12 | 1 | 61 | 66 | 13 | 41 |
| DelegationBoundaryClass | 24 | 18 | 53.0 | 274 | 37 | 37 | 37 | 1 | 0 | 1 | 1 | 36 | 0 | 37 |
| BankingBoundary | 3 | 1 | 19.0 | 82 | 5 | 5 | 5 | 2 | 3 | 1 | 4 | 10 | 6 | 15 |
| ZipFolder | 11 | 10 | 24.0 | 91 | 4 | 4 | 4 | 2 | 4 | 1 | 7 | 15 | 10 | 26 |

EARLY ANALYSIS OF SOFTWARE DESIGN DIAGRAMS

CROSS-REFERENCE TO RELATED APPLICATION

This application claims the benefit of and priority to prior Indian patent application number 1198CHE/2011, entitled "EARLY ANALYSIS OF SOFTWARE DESIGN DIAGRAMS," filed on Apr. 7, 2011, the entire disclosure of which is hereby incorporated herein by reference.

SUMMARY

Software system design issues are typically identified in the later stages of the Software Development Life Cycle (SDLC) and can cause extensive delays and increased costs for software development projects. Prior design tools are unable to measure design quality in quantitative form and do not allow software development teams to rectify design issues earlier in the lifecycle. Tools for increasing software design quality early in the software development lifecycle can help prevent downstream development issues, save development cost, and/or ensure proper development lifecycle time.

Design diagrams for software applications can be used in the early software design phase to create object models for software systems. Examples of design diagrams include Unified Modeling Language ("UML") structure diagrams (such as class diagrams, component diagrams, and object diagrams), which describe the structure of objects, components, and/or classes in a system being modeled, and UML behavior diagrams (such as activity diagrams, use case diagrams, and sequence diagrams), which describe the dynamic behavior of objects, components, and/or classes.

The disclosed technology comprises exemplary tools for analyzing design quality that take software design diagrams (e.g., UML class diagrams) for software applications as inputs and generate metrics representative of the prospective quality of the resulting software system. This design quality analysis can be performed without generating either source code or pseudo code representations for the software applications. The tools and methodologies can become a part of existing design and modeling tools, thus providing design quality analysis as an additional feature of the existing design and modeling tools. Thus, exemplary techniques for supplementing traditional code-based analysis with design analysis are disclosed herein.

In some examples of the disclosed technology, a method of automatically reporting quality metrics for a class-level representation of a software application includes receiving the class-level representation of the software application, the class-level representation defining a graph including one or more object classes, selecting one or more of the object classes and calculating one or more software application quality metrics for the selected object classes indicative of prospective quality of source code produced in accordance with the class-level representation, and outputting a report including data based on the quality metrics.

In some examples, the metrics are based on properties associated with a respective class, and can be based on data that includes at least one or more of the following: a number of operations associated with the respective class, a number of attributes associated with the respective class, a number of constructors associated with the respective class, a number of overridden methods associated with the respective class, or a number of added methods associated with the respective class.

In some examples, the metrics are based on relationships between a respective class and at least one other of the object classes of the class representation, and can be based on data that includes at least one or more of the following: a depth of inheritance of the respective class, a measure of coupling between the object and the other object class, a number of responses per class for the respective class, or the number of remote methods associated with the respective class. Some examples include both one or more metrics based on properties and one or more metrics based on relationships.

In some examples, the metrics include a metric based on a count of the number of reference types that are used in attribute declarations, formal parameters, return types, throw declarations and local variables, and types from which attribute and method selections are made.

In some examples, the calculation of the quality metrics does not use source code based on the class-level representation or source code based on the objects. In some examples, the quality metrics are weighted based on whether a method is located at a remote class.

In some examples of the disclosed technology, a method of applying one or more quality metrics to one or more UML diagrams for a software application comprises receiving the UML diagrams including one or more object classes, calculating one or more software application quality metrics for a selected one or more of the object classes indicative of prospective quality of source code produced in accordance with the class-level representation, and modifying at least one of the object classes of the UML diagrams based on at least one of the quality metrics to produce one or more updated object classes.

In some examples, a method includes modifying at least one of the object classes by adding two or more subclasses for at least one of the object classes based on, for example, a NOOM metric. In some examples, the modifying at least one of the object classes includes removing an overridden method of the at least one object class and extending the functionality of a parent class of the at least one object class to provide the functionality of the overridden method, based on, for example, a NOOM metric.

In some examples, a method includes selecting the selected object classes using a graphical user interface ("GUI") tool and coding source code, the source code based at least in part on the updated object classes. In some examples, the method further includes producing computer-readable instructions based on the source code coded using the method.

In some examples, a method includes calculating or modifying object classes performed at least in part using computer-readable instructions executable by an application for editing UML diagrams of software applications using a GUI tool, where at least a portion of the computer-readable instructions are loaded by the application as a plug-in.

In some examples of the disclosed technology, computer-readable storage media store computer-readable instructions that when executed by a computer, cause the computer to perform any of the methods disclosed herein.

In some examples of the disclosed technology, a computing system includes one or more processors, one or more input devices, one or more output devices, and one or more computer-readable storage media storing computer-executable instructions, the computer-executable instructions comprising instructions for loading a class-level representation of a software application, the class-level representation defining one or more object classes and instructions for selecting one or more of the object classes, and calculating one or more software application quality metrics for the selected object classes indicative of prospective quality of source code produced in accordance with the class-level representation.

In some examples, the computer-executable instructions include instructions for providing a plug-in interface allowing an application for editing class-level representations of software applications to access functionality provided by the computer-executable instructions without recompilation of the application.

The foregoing and other objects, features, and advantages of the disclosed technology will become more apparent from the following detailed description, which proceeds with reference to the accompanying figures.

BRIEF DESCRIPTION OF THE DRAWINGS

FIG. 6A is a screen capture of a GUI tool window displaying a report including design quality metrics, a software project hierarchy, and Java code in a software design and modeling tool.

FIG. 6B is a screen capture of a GUI tool window displaying a report including a number of design quality metrics after transformation of the UML diagram into source code.

FIG. 12A illustrates a number of violations reported for a software project that did not use techniques for early design quality analysis disclosed herein.

FIG. 12B illustrates a number of violations reported for an identical software project using techniques for early design quality analysis disclosed herein.

DETAILED DESCRIPTION

Figure 1:
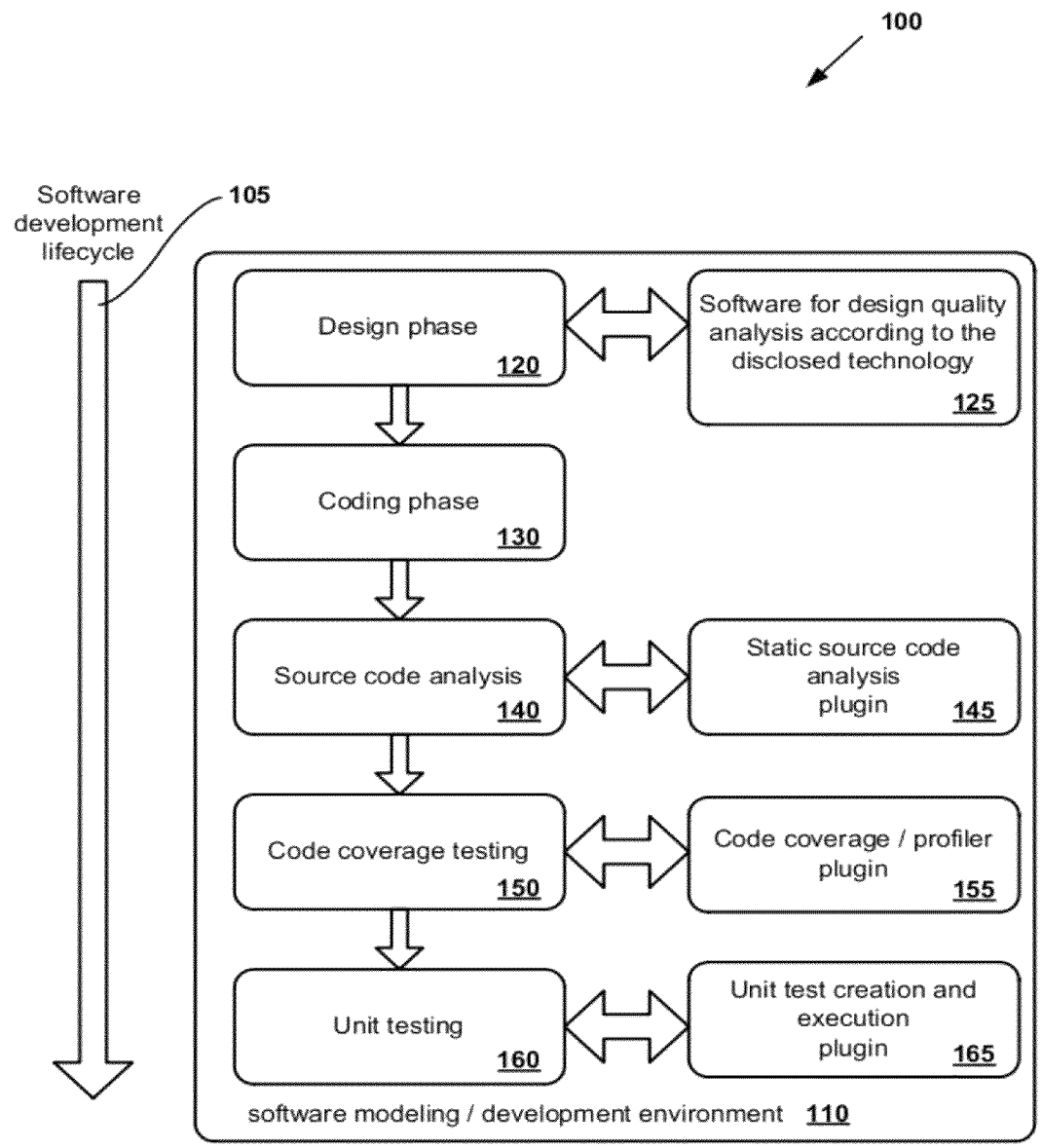
FIG. 1 is a flow diagram depicting example phases of a software development lifecycle in a software modeling and development environment.

This disclosure is set forth in the context of representative embodiments that are not intended to be limiting in any way.

As used in this application and in the claims, the singular forms "a," "an," and "the" include the plural forms unless the context clearly dictates otherwise. Additionally, the term "includes" means "comprises."

The described apparatus and methods described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and sub-combinations with one another. Furthermore, as used herein, the term "and/or" means any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged, omitted, or performed concurrently. Moreover, for the sake of simplicity, the attached figures may not show the various ways in which the disclosed apparatus and methods can be used in conjunction with other apparatus and methods. Additionally, the description sometimes uses terms like "produce," "generate," "select," "receive," "calculate," "output," "modify," "coding," "remove," and "provide" to describe the disclosed methods. These terms are high-level abstractions of the actual operations that are performed. The actual operations that correspond to these terms can vary depending on the particular implementation and are readily discernible by one of ordinary skill in the art.

Any of the disclosed methods can be implemented as computer-executable instructions stored on one or more computer-readable storage media (e.g., non-transitory computer-readable media, such as one or more volatile memory components (such as DRAM or SRAM), or nonvolatile memory components (such as hard drives) and executed on a computer (e.g., any commercially available computer or other computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network, using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, HTML5, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Theories of operation, scientific principles or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Exemplary embodiments disclosed herein include the capability to analyze and measure design quality in a quantitative form directly from software design models, without the need to generate intermediate source code or pseudo code.

Examples of the disclosed technology allow the analysis of design diagrams for software applications at an early stage in the software design lifecycle. Examples of suitable design diagrams for use with the disclosed embodiments include UML class diagrams, UML component diagrams, UML object diagrams, or other suitable design diagrams. In some examples, behavior diagrams describing dynamic behavior of objects, component, and/or classes can be analyzed. Examples disclosed herein allow software developers to avoid or abbreviate manual design reviews, where, for example, a human reviewer analyzes individual classes of a class diagram individually for quality attributes and provides comments to a software designer.

Some examples disclosed herein allow generation of quality metrics for design diagrams without converting design diagrams to pseudo code or source code. One disadvantage of techniques based on converting design diagrams to pseudo code or source code is that the design quality analysis is actually a code quality measurement based on the skeletal code thereby generated, but is not an actual design quality measurement.

According to some example methods and systems disclosed herein, design quality metrics can be produced for design diagrams, without the need to wait for intermediate code to be generated for analysis. Thus, the design review process can be more effective and streamlined, particularly in larger projects with complex architectures. The methods and systems disclosed herein thus allow design-level issues to be addressed in the design phase itself, resulting in less rework in subsequent phases of the software development lifecycle. In addition, improved design robustness, as well as software designer and software developer productivity can be achieved through the reduction of rework effort during development.

In some examples, the methods and systems can be implemented using a "plug-in" software module for design and modeling tools. Examples of suitable design and modeling tools include IBM Rational Software Architect 7.x and IBM Rational Software Modeler 7.x, although as would be readily understood by one of ordinary skill in the art, other design and modeling tools can be used. Plug-ins for the Rational Software tools can be developed using, for example, IBM Rational Tools Extensibility APIs (Application Programming Interfaces).

In some examples, design measurements can be generated in a quantitative form for use with existing .NET or Java technologies. In some examples, reports of quality metrics can be generated in HTML, XML, CSV, Microsoft Excel, and/or text formats.

FIG. 1 is a flow diagram 100 depicting example phases of a software development lifecycle 105 in a software modeling and development environment 110. As shown, design diagrams, such as UML class or object diagrams, are generated during the design phase 120. For example, a design and modeling tool, such as IBM Rational Software Architect 7.x or IBM Rational Software Modeler Software 7.x, can be used to generate design diagrams. Software for design quality analysis 125, according to the technology disclosed herein, can be integrated with the design and modeling tools as, for example, a software plug-in. Such a software integration further improves the responsiveness of the design and modeling tool, and improves software designer productivity. Standalone tools that read design diagrams output by the design and modeling tools, or other techniques for integration, can also be used.

During coding phase 130, source code for implementing a software design described using design diagrams during the design phase can be generated. Typically, source code is generated by hand, using the design diagrams to provide interface information and class definitions. In some examples, source code interface stubs for object classes can be automatically generated. For example, stub listings (including object names, associated methods, and associated parameters) can be generated, and a software developer completes the objects by writing code to implement the object using the stub code listing as a template. In other examples, pseudo code is generated based on the design diagrams using, for example, an automated tool.

After at least a portion of the source code has been generated, it is analyzed during a source code analysis phase 140. During the source code analysis phase, analysis tools such as static source code analysis tools can be used to analyze source code quality without executing the source code. For example, a static source code analysis tool can read stub code or completed source code and generate metrics for the source code. Examples of a suitable source code analysis tool 145 for a Java and .NET-based software development environment include tools from Infosys, such as FxCop Quality Analyzer, PQM-Meter, and QA4J, and other tools such as PMD, N-Depend, VSTS-2008/2010. Example techniques of static source code analysis include the use of formal tools or Lint-like tools.

During code coverage testing phase 150, structural analysis of the source code is performed using a suitable code coverage analysis tool 155, for example, JProbe from Quest software. During code coverage testing, techniques such as function coverage, statement coverage, decision coverage, and condition coverage are applied using a series of coverage tests that execute the source code. For example, function coverage determines which source code functions are called, statement coverage determines which source code statements are executed, decision coverage determines which requirements of source code control statement edges (e.g., if-then and case statements) have been met, and condition coverage determines which Boolean expressions have evaluated to both true and false.

During unit testing phase 160, unit tests (e.g., unit tests written by a software developer) are executed on individual components (for example, procedures or classes) of the software application being developed and compared to a unit test dictionary to determine whether the functions were properly executed. An example of a suitable unit testing tool 165 is JTest from Parasoft.

Figure 2:
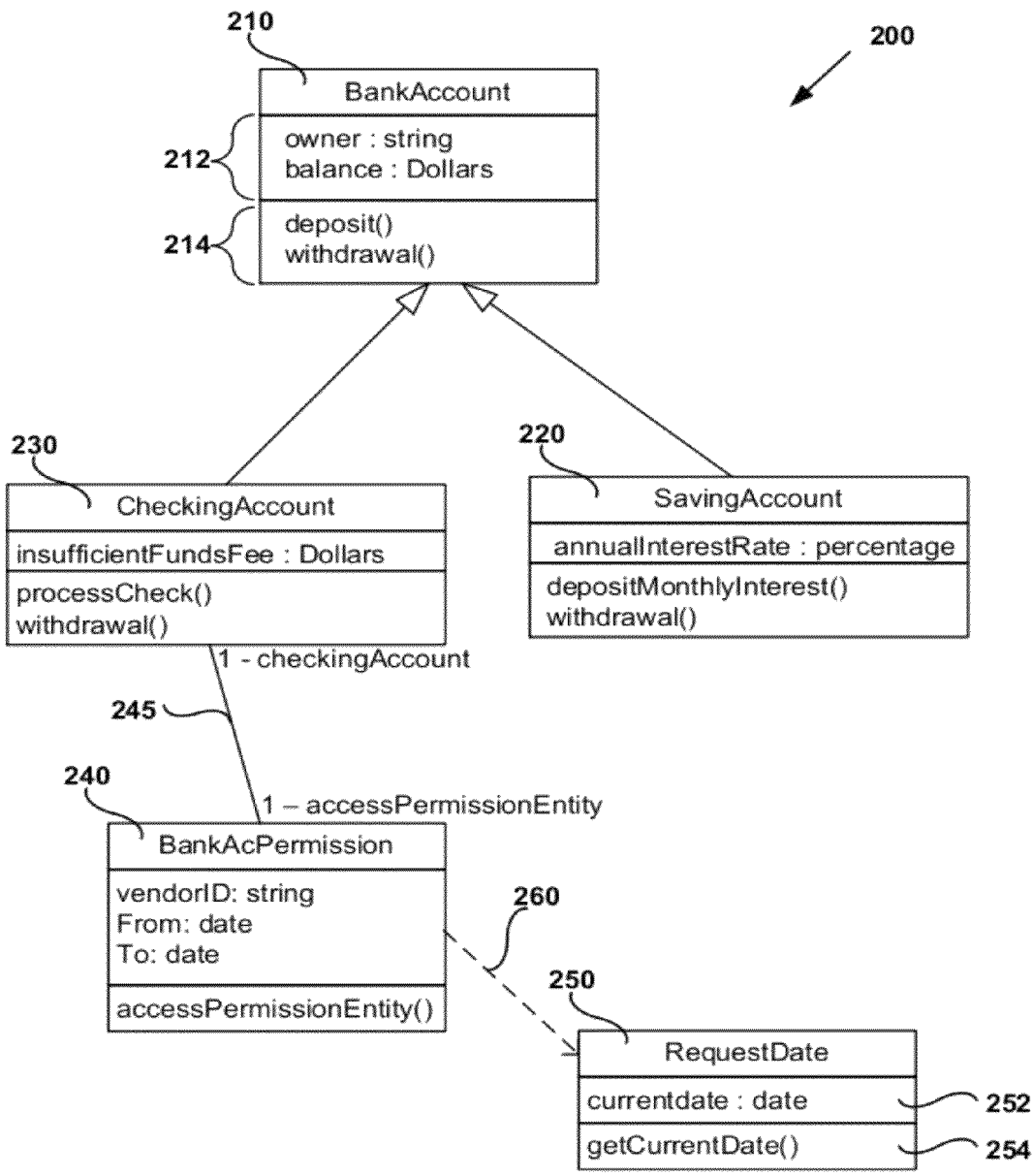
FIG. 2 is an example of a UML class diagram.

FIG. 2 is an example class diagram 200 illustrating several object classes and relationships between object classes: BankAccount 210, SavingAccount 220, CheckingAccount 230, BankAcPermission 240, and RequestDate 250. For example, the BankAccount class 210 includes several interface parameters 212 (e.g., owner, of datatype string, and balance, of datatype Dollars, and other such interface parameters) and several methods 214 (e.g., deposit( ) withdrawal( ) and other such methods). Also shown are object classes SavingAccount 220 and Checking Account 230, which are child classes of the BankAccount class 210, and therefore inherit method and parameters from the BankAccount class by default. For example, SavingAccount 220 also defines its own parameter "annualInterestRate" and methods "depositMonthlyInterest( )" and "withdrawal( )" Also shown in FIG. 2 are respective data types for interface parameters (e.g., int, long int, percentage, string, float, pointer, handle, including user-define datatypes, such as Dollars).

Because SavingAccount 220 and CheckingAccount 230 are subclasses, they will inherit parameters and methods from its parent class BankAccount 210, except in cases where a child class overrides a parent class parameter or method. For examples, both SavingAccount 220 and CheckingAccount 230 define their own withdrawal( ) methods, which will override the withdrawal( ) method defined by the BankAccount class 210.

The BankAcPermission class 240 is related to the CheckingAccount class 230 by a bidirectional association, as indicated by the solid line 245 joining the two classes. As shown (according to UML conventions), there is a one-to-one association between the checking account class 230 (an example checking account) and BankAcPermission class 240 (an example accessPermissionEntity).

Also shown is the RequestDate 250 object class, which includes an interface parameter currentDate 252 and method getCurrentDate( ) 254. As shown by a dashed arrow 260, the getCurrentDate( ) method of the RequestDate class 250 is accessed via a remote procedure call. Thus, design quality metrics based on an analysis of remote classes and methods can be determined.

By analyzing parameters, methods of classes, and the relationships between classes, a quality metric representing the prospective quality of a software application developed based on the class diagram 200 can be determined. Thus, the class diagram 200 can be considered a graph, with classes as nodes and relationships (e.g., procedure calls, inheritance relationships, and associations) as edges.

As used herein, the term "class diagram" is not limited to a UML class diagram, such as depicted in FIG. 2. Further, the disclosed technology can be generally applied to any suitable form of software design diagram and is not limited to just class diagrams.

FIGS. 3-6B include screenshots of example implementations of the disclosed technology integrated with a design modeling tool as a plug-in. Examples of early design analysis during the design phase 120 of a software project are shown. The classes shown in the example implementation screenshots include those based on the UML diagram 200 shown in FIG. 2 and should not be construed as limiting.

Figure 3:
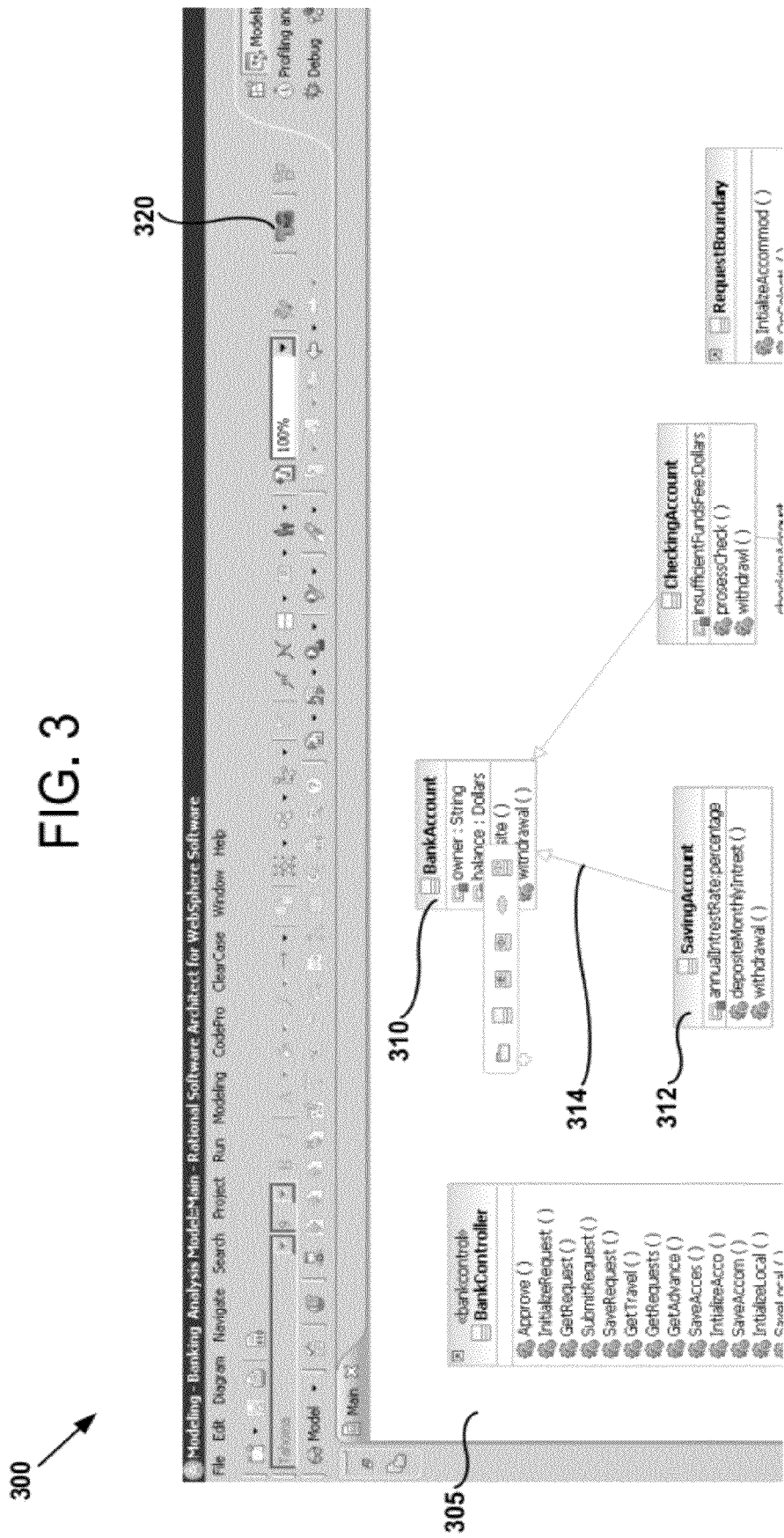
FIG. 3 is a screen capture of a GUI tool window displaying a UML diagram in a software design and modeling tool.

FIG. 3 is a partial screen capture 300 of a GUI tool window 305 of a design modeling tool displaying a UML diagram. Shown are a number of graphical representations 310 and 312 of classes in a software design diagram. Relationships between classes, such as an inheritance relationship, can by shown using an arrow 314. A number of classes can be selected using the GUI interface to select their corresponding graphical representations 310 and 312. Quality metrics for the selected classes can then be calculated by invoking a design quality analysis tool, for example, by pressing a GUI button 320. Using a plug-in architecture for the design quality analysis tool allows a close integration between the analysis tool and the design modeling tool.

Figure 4:
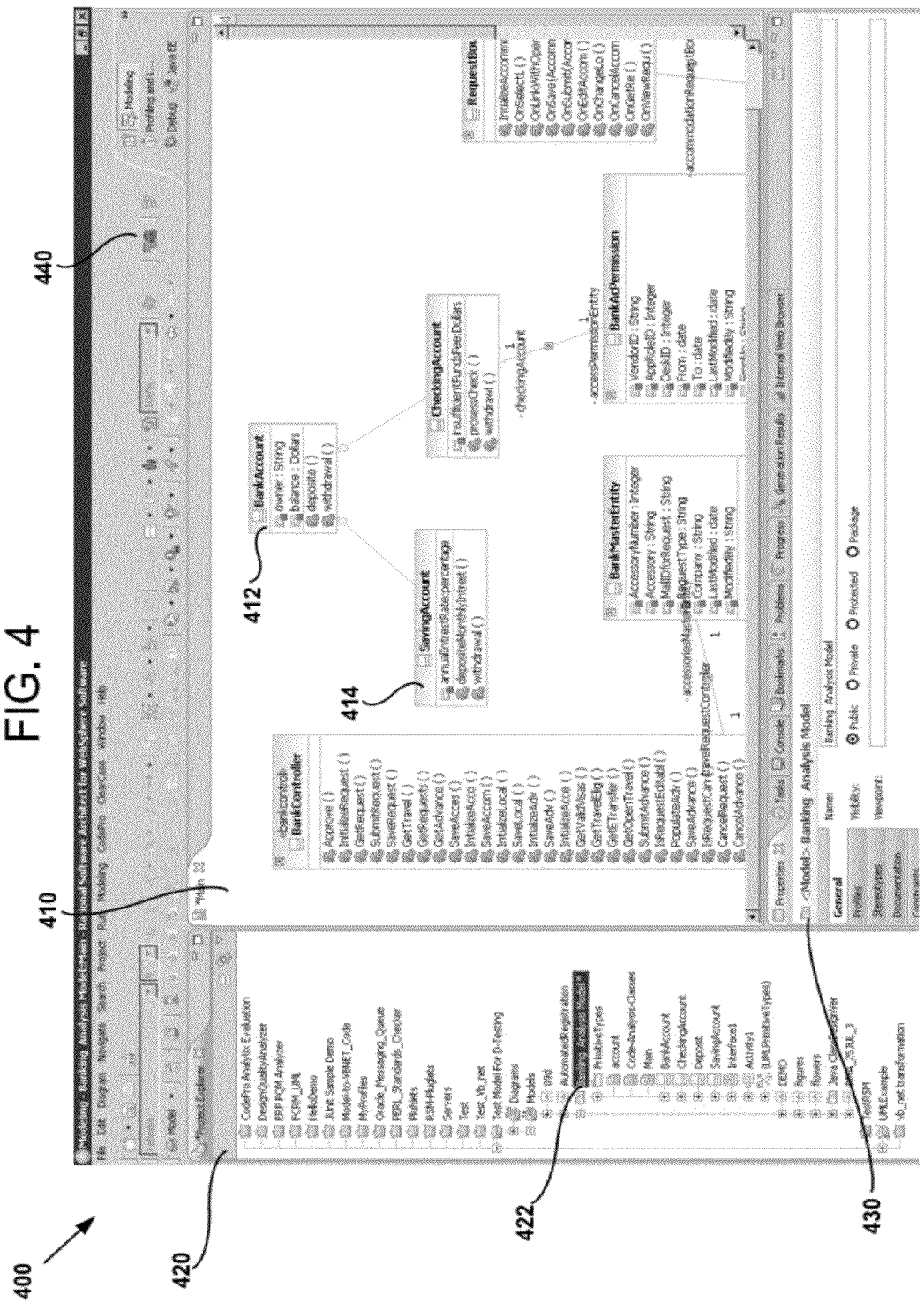
FIG. 4 is a screen capture of a GUI tool window displaying a UML diagram and software project hierarchy.

FIG. 4 is a partial screen capture 400 of a GUI tool window of a design modeling tool displaying a UML diagram in a UML browser window 410, a software project hierarchy browser window 420, and details of a selected model in a class browser window 430. As shown, a number of graphical representations, including representations 412 and 414 of classes in a software design diagram are displayed. Hierarchy for the associated software project is shown in a software project browser window 420. A selected model 422 is highlighted to indicate that the model has been selected for calculation of quality metrics. Further details of the selected model are displayed in a GUI tool window 430. A user can use the software project browser to select one or more classes or models for calculation of quality metrics, and invoke quality metric calculations using a button 440 of the GUI tool window. Using a plug-in architecture for the design quality analysis tool allows a close integration between the analysis tool and the design modeling tool for viewing errors and warnings, without the need for a user to open and view HTML or text files using, for example, a separate application.

Figure 5A:
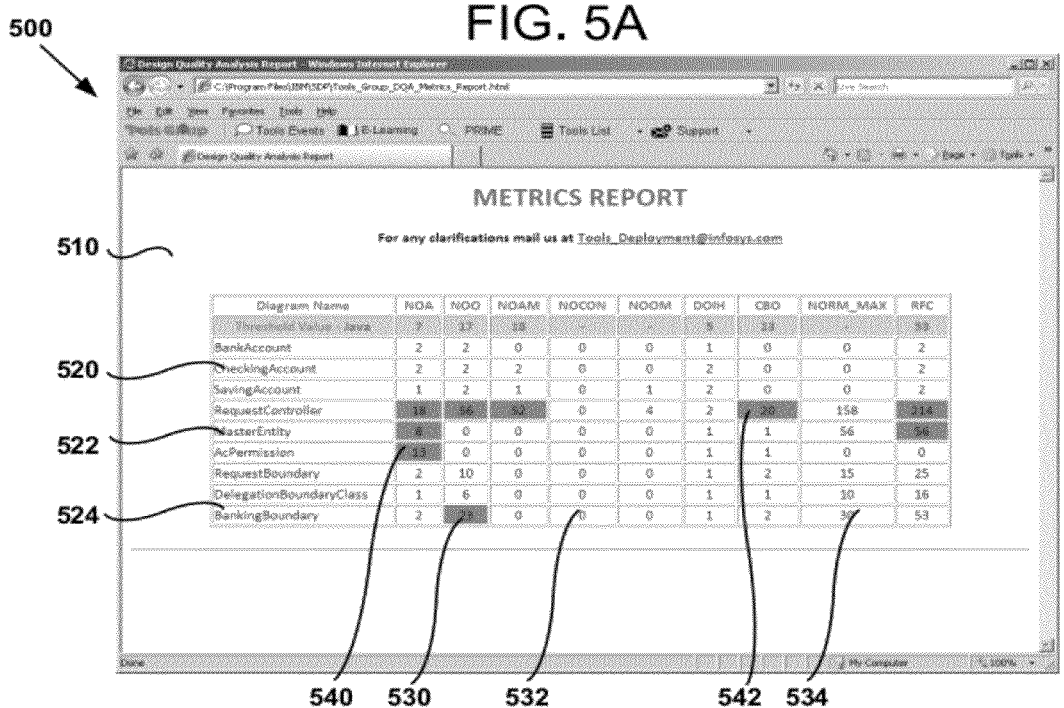
FIG. 5A is a screen capture of a web page displaying a number of design quality metrics for a number of UML classes.

FIG. 5A is a screen capture 500 of a browser displaying a quality metrics report 510 according to the disclosed technology. As shown, a number of diagram names, including diagram names 520, 522, and 524, are listed in rows. Also shown are a number of columns, including columns 530, 532, and 534, one column for each design quality metric. For each metric, a numeric value reporting a quality metric score for each diagram name is displayed. A number of quality metrics that exceed a pre-selected threshold (e.g., a user-defined or default threshold) are highlighted (e.g., highlighted metrics 540 and 542) in order to bring these metrics to the attention of the person reviewing the report 510.

Figure 5B:
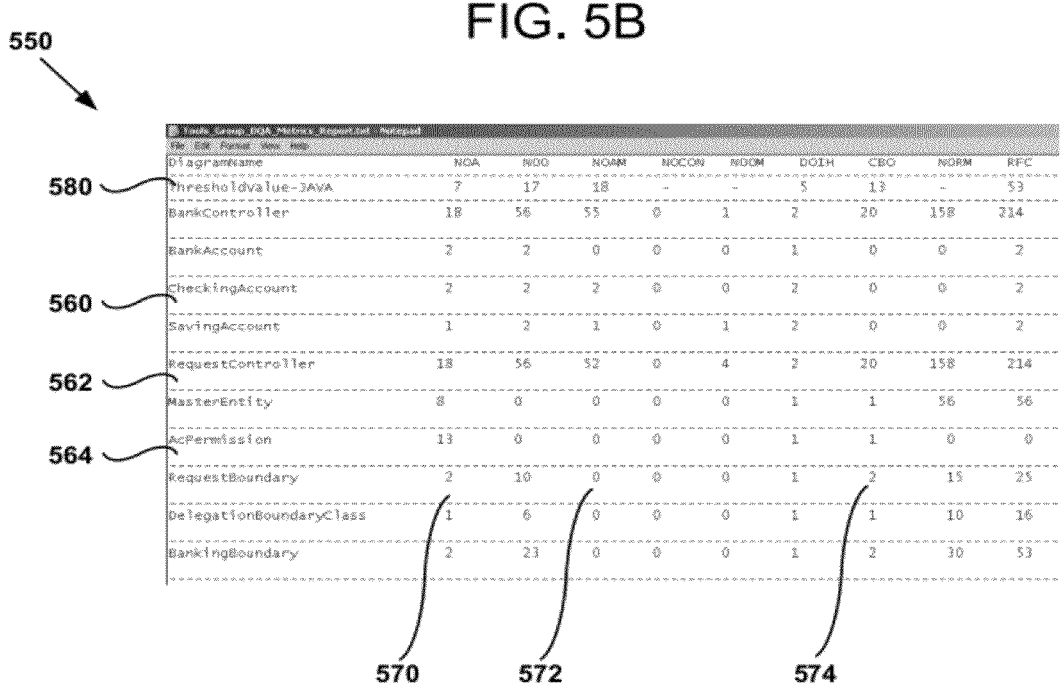
FIG. 5B is a screen capture of a text file including a number of design quality metrics for a number of Java objects.

FIG. 5B is a screen capture 550 of a design quality metrics report being displayed as a text file. As shown, a number of diagram names, including diagram names 560, 562, and 564, are displayed in the first column. Also shown are a number of columns, including columns 570, 572, and 574, one column for each design quality metric. In addition, pre-selected threshold values for each metric are shown in the first data row 580.

Calculation of the design quality metrics reported in FIGS. 5A and 5B will be discussed in further detail below.

Figure 6A:
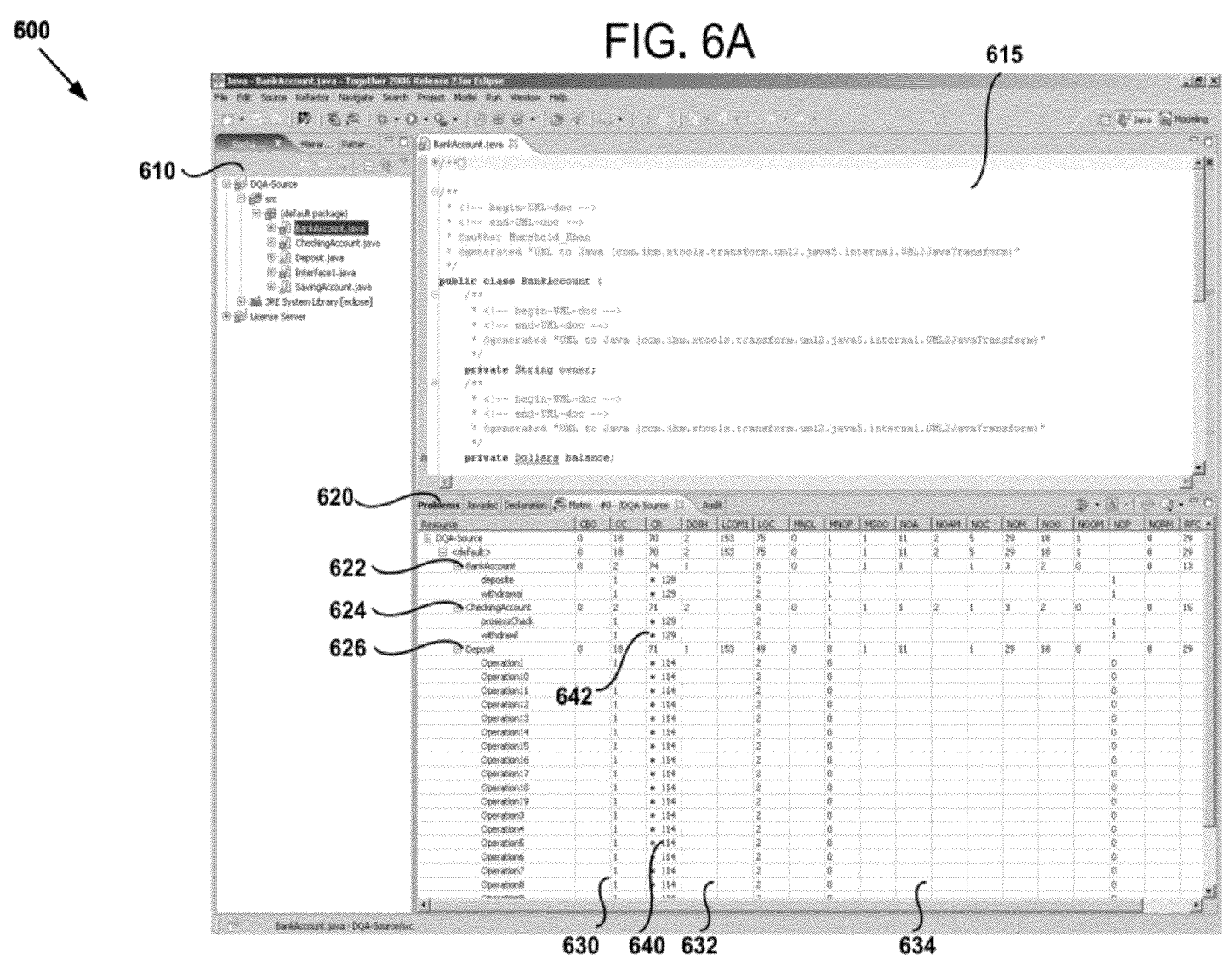

FIG. 6A is a screen capture 600 of a design modeling environment displaying a project hierarchy browser 610, an object source code view 615, including a display of interface code for an object, and a design quality metrics report 620. As shown, a number of object class names, including object class names 622, 624, and 626, are listed in rows. Also shown are a number of columns, including columns 630, 632, and 634, one column for each design quality metric. For each metric, a numeric value reporting a quality metric score for each diagram name is displayed. A number of quality metrics that exceed a pre-selected threshold are highlighted (e.g., by a symbol, such as symbols 640 and 642) in order to bring these metrics to the attention of the person reviewing the report.

Figure 6B:
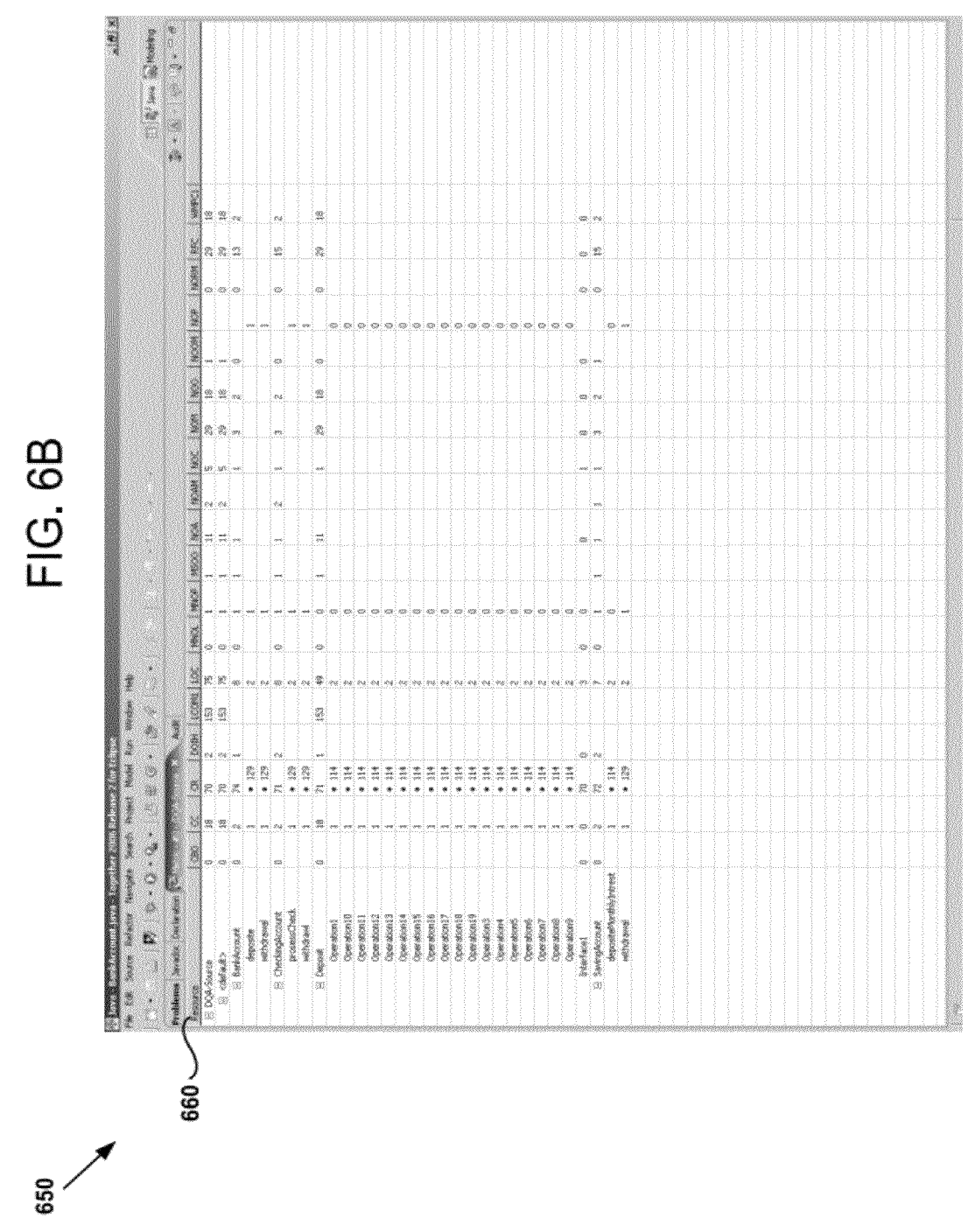

FIG. 6B is a screen capture 650 of a design modeling environment displaying a design quality metrics report 660. As shown, a number of object class names are listed in rows, and design quality metrics are displayed as columns.

FIGS. 7-10 are flowcharts outlining exemplary methods of calculating quality metrics and modifying class representations, for example, during the design phase 120 of a software application. The screenshots shown in FIGS. 3-6B are example screenshots of GUI interfaces that can be generated and displayed during performance of exemplary portions of the methods of FIGS. 7-10.

Figure 7:
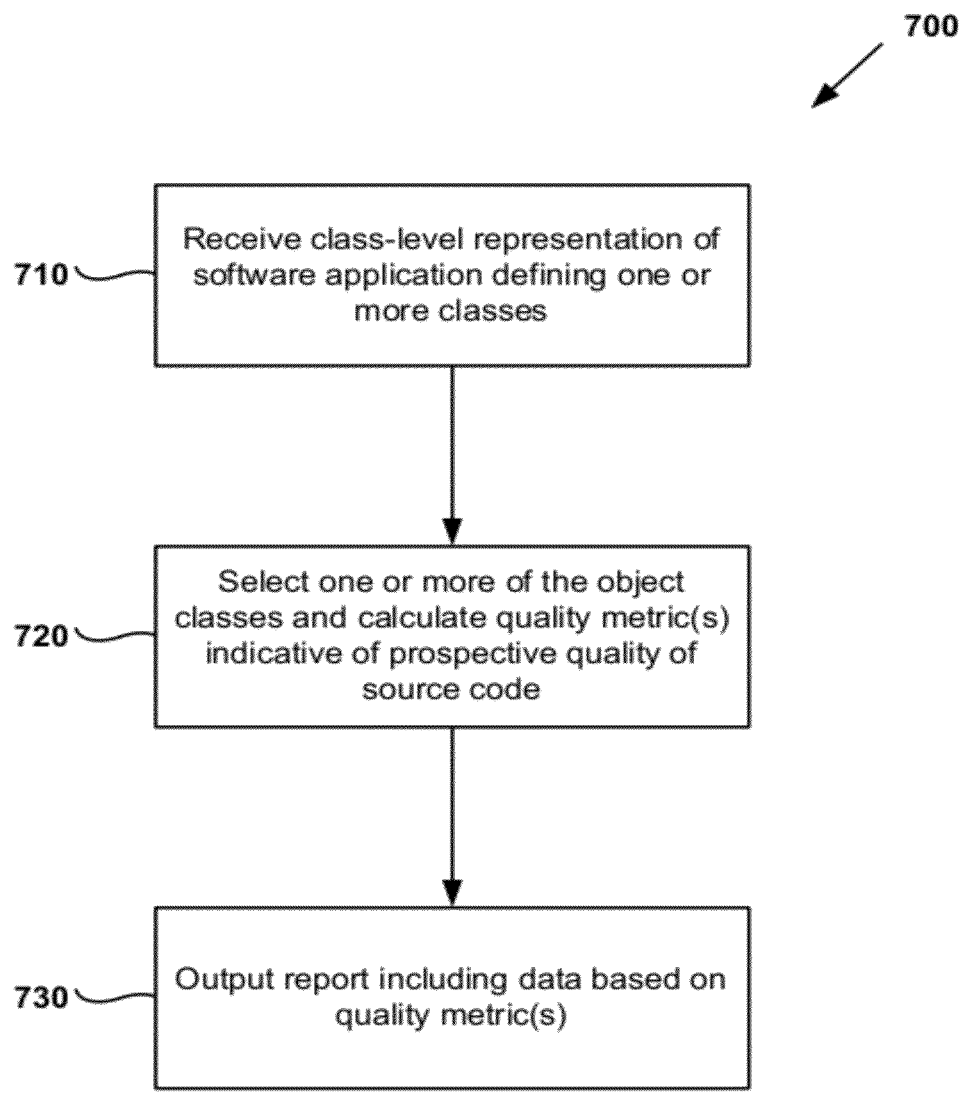
FIG. 7 is a flow chart that outlines an exemplary method of generating a report with design quality metrics according to the disclosed technology.

FIG. 7 is a flow chart 700 that outlines an exemplary method of receiving a class-level representation of a software application and calculating quality metrics indicative of the prospective quality of source code based on the class-level representation.

At process block 710, a class-level representation is received (e.g., buffered into a computer-readable memory, loaded, or otherwise accessed and/or prepared for further processing) defining one or more object classes. The class-level representation also includes information on object attributes, and on relationships between classes, such as inheritance and method calls to other objects. In some examples, the class-level representation is a UML class diagram.

At process block 720, one or more of the object classes are selected for quality metrics to be calculated. For example, a user of a design modeling program can select one or more object classes for quality metric calculation (e.g., by selecting via a suitable graphical user interface). In other examples, other selection techniques can be used, or the quality metrics can be calculated for all the object classes of the representation. In some embodiments, the quality metrics can be based solely on the class-level representation, and need not generate source code, pseudo code, or other code based on the class-level representation in order for the metrics to be generated. Thus, the quality metrics can be performed at a high level of abstraction and at an early phase of the software design process.

At process block 730, an output report is generated including data based on the quality metrics calculated at process block 720. In some examples, the data is reported in a file, such as a text, HTML, XML, or other suitable file. In some examples, the data is reported using a GUI of the software design environment being used.

Figure 8:
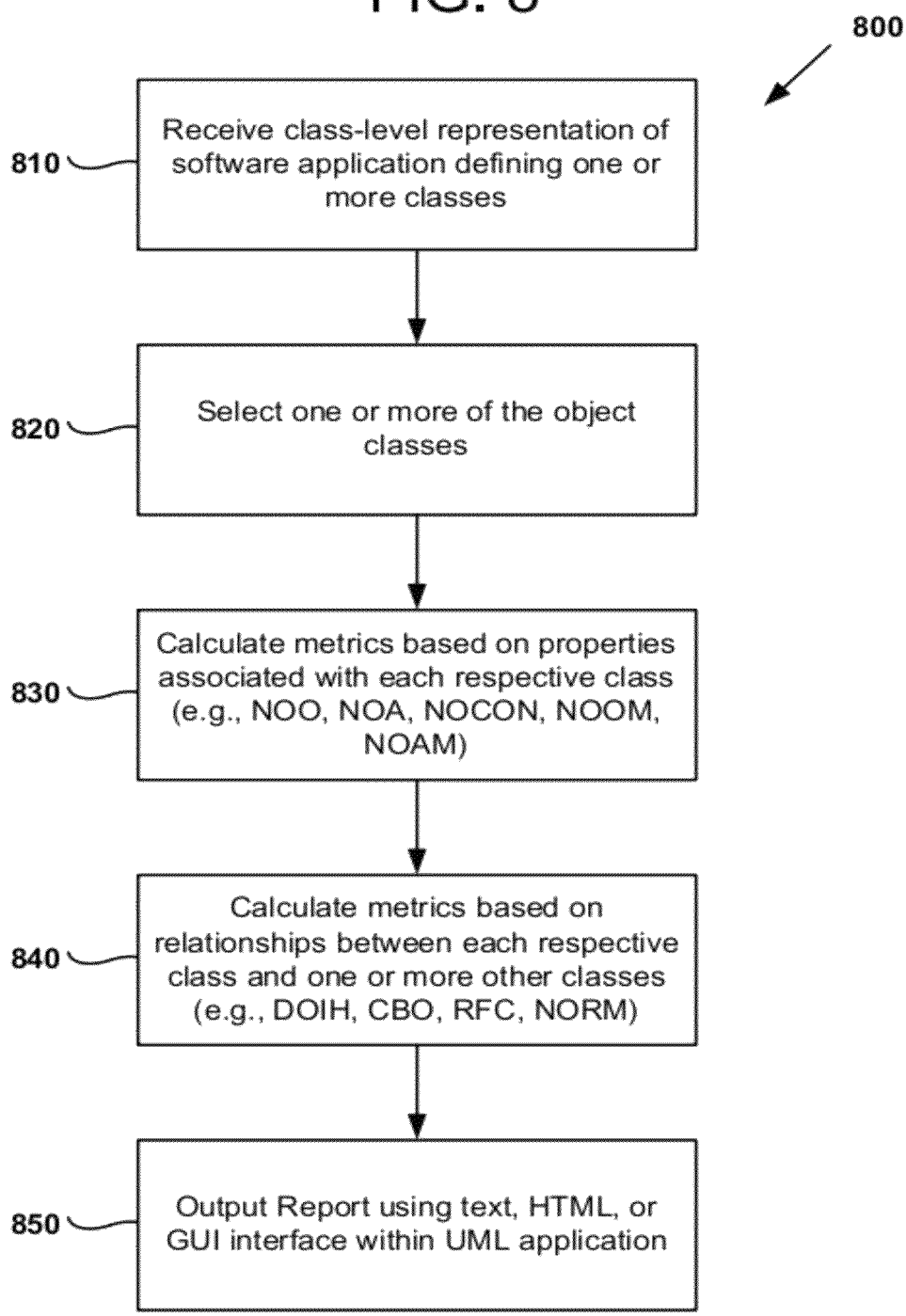
FIG. 8 is a flow chart further detailing an example implementation of the method of FIG. 7.

FIG. 8 is a flow chart 800 that further details processes that can be performed in some implementations of the exemplary method depicted in FIG. 7.

At process block 810, a class-level representation is received defining one or more object classes. While the examples disclosed herein are typically based on UML class diagrams, it should be readily understood that other suitable high-level representations can be used, for example, structural diagrams (such as UML object diagrams or UML component diagrams) or behavior diagrams (such as UML activity diagrams, use case diagrams, or sequence diagrams). Such high-level representations can include class definitions (including interface parameters and interface methods associated with a class) and relationships between objects (such as descriptions of class inheritance, procedure calls, remote procedure calls, or other suitable relationships). In some examples, the class-level representation can be received from a file stored in a storage medium, from a database, or from existing object data in a software design application program.

At process block 820, one or more of the object classes are selected for one or more quality metrics to be calculated, using similar selection techniques to those described above at process block 720.

At process block 830, for each selected object class, a number of quality metrics based on properties associated with a respective object class are calculated. These can include metrics such as NOO, NOA, NOCON, NOOM, and NOAM, and are described immediately below. The calculated quality metrics can be reported using any suitable data type, for example, as an integer, a fixed point number, a floating point number, a string, or a Boolean. In some examples, the quality metrics can be compared to a pre-selected threshold, (e.g., a user-defined or default threshold) and values that exceed (or do not meet) the threshold can be highlighted so that additional attention can be applied to address any design issues that could result.

A NOO (Number Of Operations) quality metric (or "score") can be calculated as a sum of the number of methods defined in a class representation of an object in a class diagram or object diagram representation. In some examples, a class with three external methods receives a NOO score of 3. Using this NOO definition, BankAccount class has a NOO score of 2, as shown in FIG. 2. In some examples, the NOO metric can be weighted based on the prospective complexity of the method. For example, external method calls can be weighted higher than local method calls, or vice versa. Other examples of method classifications that can be weighted differently include: method calls based on built-in or standard library functions, comparison methods, or objection constructors. In some examples, the NOO score includes a count for methods of children classes of a parent class, while in other examples, only methods defined in the class representation of a particular class are counted. Classes with a high NOO score can be flagged for consideration of whether the classes should be divided into a number of subclasses.

A NOA (Number of Attributes) quality metric can be calculated as the sum of the number of attributes (e.g., interface parameters associated with a class) in a class diagram or object diagram representation. In some examples, a class with three interface parameters receives an NOA score of 3. Using this NOA definition, the SavingAccount class 220 has an NOA score of 1, as shown in FIG. 2. In some examples, the NOA metric can be weighted based on the data type of interface parameters. For example, string and float data types can be weighted higher than int and Boolean data type interface parameters. In some examples, the NOA score includes attributes for children classes of a parent class, while in other examples, only methods defined in the class representation of a particular class are counted. In some examples, the NOA score includes the number of inherited attributes from parent classes, but not children classes.

A NOCON (Number of Constructor) quality metric can be calculated as the sum of the number of user-defined constructors for a class in a class diagram or object diagram representation. In some examples, a class with no user-defined constructors receives a NOCON score of zero, and a class with two user-defined constructors receives a NOCON score of 2. In some examples, the NOCON score can be weighted such that classes having a single user-defined constructor have the lowest NOCON score, while classes with zero or two or more have higher scores. Such a scoring reflects that source code based on a class with no user-defined constructor can have a high potential for coding errors, as automatically-defined constructors may not handle corner cases as well as a single user-defined constructor, which presumably initializes objects of the class correctly. As more constructors are defined for a class, however, the potential for coding errors increases. In some examples, the NOCON score includes attributes for parent classes of a particular class when the class inherits a constructor from its parent class. In some examples, the NOCON quality metric does not include default constructors, but is a count of only user-defined constructors.

A NOOM (Number of Overridden Methods) quality metric can be calculated as the sum of a number of inherited methods overridden for a class in a class diagram or object diagram representation. In some examples, a class with two overridden methods receives a score of 2. In some examples, the NOOM score can be weighted such that overridden built-in methods are weighted differently than overridden user-defined methods. For example, the withdrawal( )method of the CheckingAccount class 220 in the class diagram of FIG. 2 is an overridden method for the method withdrawal( ) defined by the BankAccount parent class 210, and the NOOM metric is increased by a first weighted amount based on its parent class method being overridden. Higher values for NOOM quality metrics generally indicate that subclasses should be added, and/or that functionality of parent classes should be extended rather than overridden.

A NOAM (Number of Added Methods) quality metric can be calculated as a sum of the number of methods added to a class in a class diagram or object diagram representation. In some examples, a class with two added methods receives a score of 2. In some examples, the NOAM score excludes any overridden methods (for example, methods considered overridden for purposes of calculated the NOOM metric), while in other examples, all added methods are included in the score. For example, the SavingAccount class 230 has two added methods in the class diagram of FIG. 2.

In some examples, the quality metrics can include statistical metrics beyond simple sums of class properties and relationships. For example, overall statistics for the class diagram, such as mean, median, or standard deviation for one or more metrics can be applied in calculating individual quality metrics.

At process block 840, for each selected object class, a number of quality metrics based on relationships between a respective object class and other classes in a class-level representation are calculated. These can include metrics such as DOIH, CBO, RFC, and NORM, which are described immediately below. The calculated quality metrics can be reported using any suitable data type, for example, as an integer, a fixed point number, a floating point number, a string, or a Boolean. In some examples, the quality metrics can be compared to a pre-selected threshold (e.g., a user-defined or default threshold), and values that exceed (or do not exceed) the threshold can be highlighted so that additional attention can be applied to address any design issues that could result.

A DOIH (Depth of Inheritance) quality metric can be calculated as the length of the inheritance chain from the root of a given classes' inheritance tree to the given class. For example, a class having a child class, where the child class itself having its own child class, would have a DOIH score of 2. In some examples, the DOIH score can be weighted to reflect the number of children classes at a particular level, while in other examples, the DOIH score reflects only the maximum class depth. For example, the BankAccount class 210 has a DOIH score of 1, as it has two child classes CheckingAccount 230 and SavingAccount 220 at the same level of inheritance. Note that in this example, the association 245 between the CheckingAccount class 230 and BankAcPermission 240 class does not increase the DOIH score in this example.

A CBO (Coupling between Object) quality metric can be calculated based on a measure of the amount of coupling between a respective object class and other object classes in a class level representation. For example, the CBO metric can be calculated as the sum of the number of inheritance, association, and other suitable object class relationships for a respective object. In some examples, the CBO is a count of the number of reference types that are used in attribute declarations, formal parameters, return types, throw declarations and local variables, and types from which attribute and method selections are made. In some examples, two classes are said to be coupled when methods declared in one class uses methods or instance variables defined by the other class. For example, CheckingAccount class 230 has a CBO metric of 2, based on one inheritance relationship to its parent BankAccount class 210, and its association relationship to the BankAcPermission class 240.

A RFC (Response per Class) quality metric can be calculated based on the number of remote method calls to a respective object class in a class-level representation. The size of the response set for a given class includes methods in the class's inheritance hierarchy and methods that can be invoked on other objects. Classes that provide a larger response set are generally considered to be more complex and require more effort in testing than ones with smaller overall design complexity. In some examples, the RFC can be calculated as the sum of the NOO for a given class, including NOO for parent classes, and NORM metrics for public methods of the class.

For example, an object class that receives method calls from three other object classes and has five operations defined in a class-level representation can have an assigned RFC score of 8. In some examples, the RFC score can be weighted based on whether the remote method call is from an object located at a remote server. Using this approach, the RequestDate class 250 in FIG. 2 would have additional weight assigned the NORM portion of the RFC score for the calling BankACPermission class 240, because it is implemented as a remote object (as indicated by a dashed arrow 260). In other examples, the RFC score is not weighted based on whether remote method calls are to a remote server.

A NORM (Number of Remote Methods) quality metric can be calculated based on the number of remote method calls from an object class in a class-level representation. In some examples, the NORM metric counts the number of remote methods to be called for all methods and constructors for a given class. As used herein, a remote method is defined as a method that is not declared in the class itself or in its ancestors. For example, an object class that is defined in a class-level representation to include 3 remote method calls can have an assigned NORM score of 3. In some examples, the NORM score can be weighted based on whether the remote method call is to an object located at a remote server. For example, the method call to the RequestDate class 250 from the BankAcPermission class 210 in FIG. 2 would be given a higher weight, because the method call is to a remote server, as indicated by a dashed arrow 260 in the class level representation.

At process block 850, a report of the quality metrics calculated at process blocks 830 and 840 is produced. For example, an HTML file or text file can be used to report the metrics, as shown in FIGS. 5A and 5B, respectively. In some examples, an XML file is used. In some examples, the quality metrics can be reported to a design and modeling tool, so that the metrics can be reported using a window of a graphical user interface of a design and modeling tool (for example, as shown in FIGS. 6A and 6B) or back-annotated to the class representation itself (for example, by displaying metrics, colors, or icons on the respective object classes displayed superimposed over the UML diagram 305 shown in FIG. 3). If pre-selected threshold values (e.g., a user-defined or default threshold values) are defined for one or more of the quality metrics, these can also be displayed as an indication of how much a metric varies from its corresponding pre-selected threshold. Table 1, below, lists an exemplary set of pre-selected threshold values for class diagrams for Java and .NET software application. The threshold values can be empirically determined based on, for example, data analysis of software projects or feedback from software designers.

TABLE 1

| Metrics | NOA | NOO | NOAM | DOIH | CBO | RFC | NOCON | NORM | NOOM |
|---|---|---|---|---|---|---|---|---|---|
| Java | 7 | 17 | 18 | 5 | 13 | 53 | — | — | — |
| .NET | 15 | 14 | 11 | 2 | 8 | 22 | 3 | — | 5 |

Figure 9:
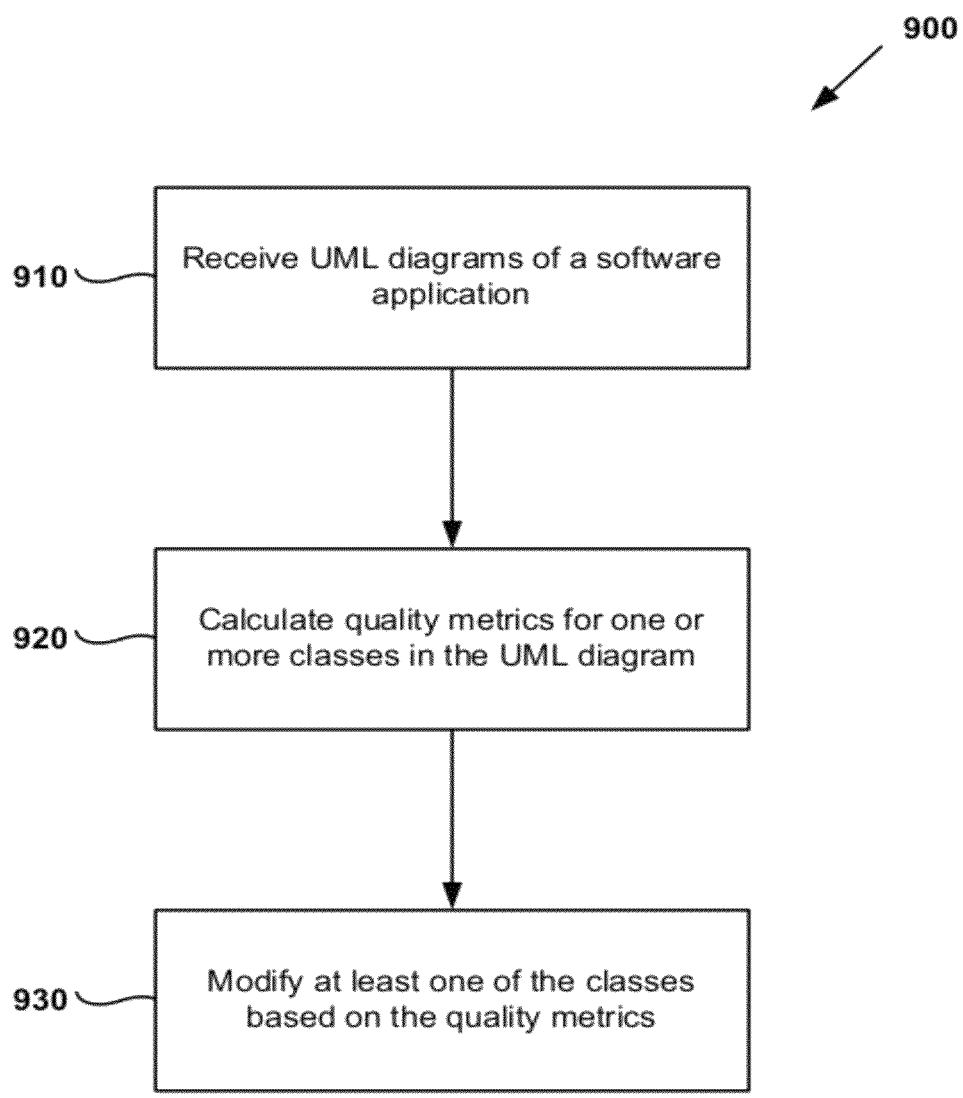
FIG. 9 is a flow chart that outlines an exemplary method of modifying classes based on design quality metrics according to the disclosed technology.

FIG. 9 is a flow chart 900 that outlines an exemplary method of receiving a class-level representation of a software application, the class-level representation including one or more object class definitions, calculating quality metrics indicative of the prospective quality of source code based on the class-level representation, and modifying one or more of the class definitions based on the quality metrics.

At process block 910, a class-level representation is received defining attributes and relationships for one or more object classes. As shown in FIG. 9, a UML diagram is the received class-level representation in this example, although other suitable representations can be used.

At process block 920, one or more quality metrics for the UML diagram received at process block 910 are calculated. The quality metrics calculated can include those based on properties associated with an object class (for example, similar to those calculated at process block 830, above) and those based on relationships between a respective object class and other classes in the class-level representation (for example, similar to those calculated at process block 840, above).

At process block 930, one or more of the object classes are modified based on the quality metrics calculated at process block 920. For example, based on a NOO (number of operations) score for an object class exceeding a pre-selected threshold, a single object class can be broken into two or more object classes, to reduce the NOO score. Alternatively, one or more operations can be removed from the object class. Similarly, classes can be modified for other quality metrics. For example, objects having a high RFC or NORM metric can be redefined to reduce the number for remote function calls or remote method calls. Thus, a class representation can be improved to reduce potential errors later in the software development lifecycle.

Figure 10:
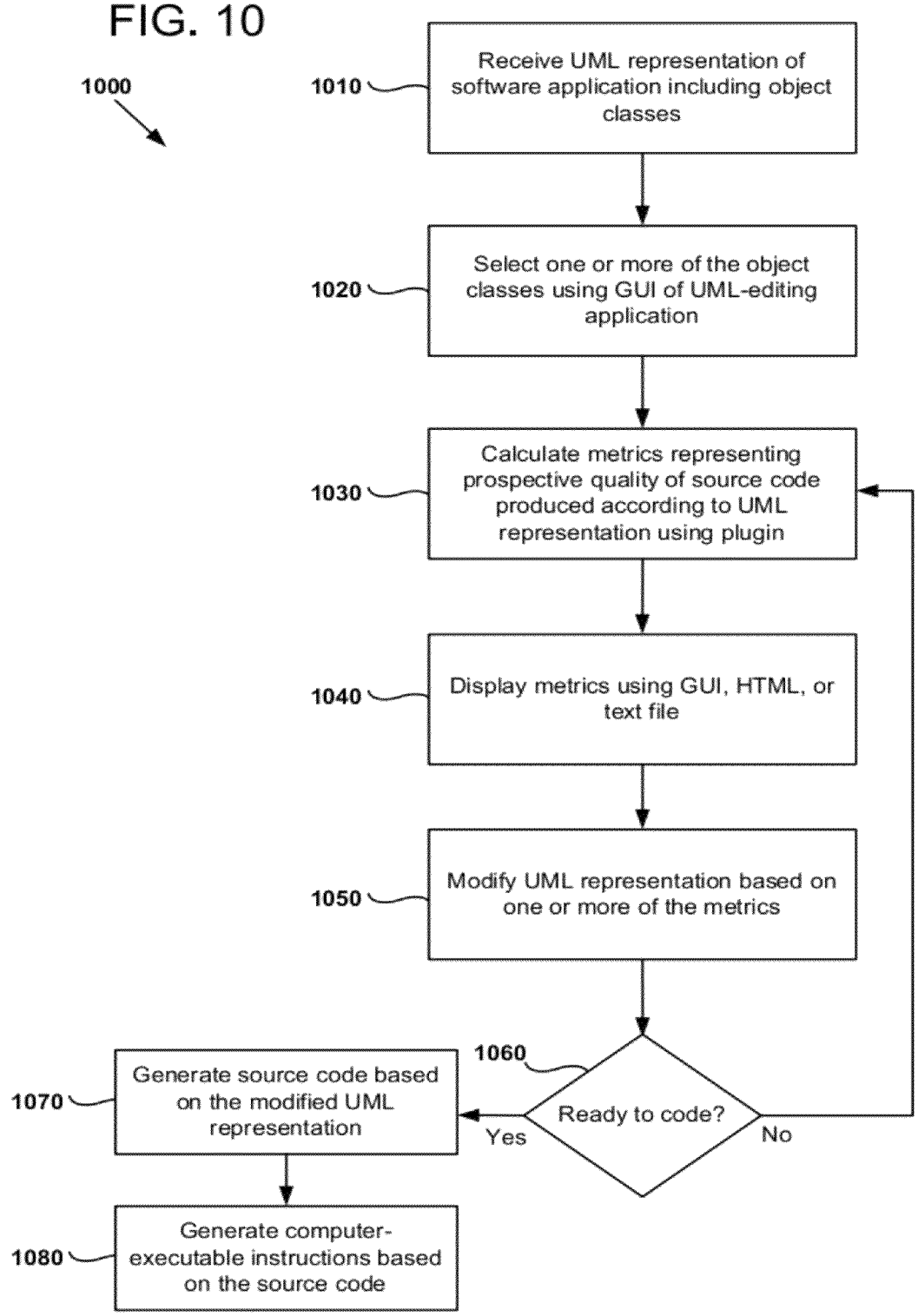
FIG. 10 is a flow chart further detailing an example implementation of the method of FIG. 9.

FIG. 10 is a flow chart 1000 that further details processes that can be performed in implementations of the exemplary method depicted in FIG. 9.

At process block 1010, a UML representation of a software application is received, including definitions for one or more object classes, and relationships between one or more of the object classes.

At process block 1020, one or more of the object classes can be selected using a GUI of a UML-editing application. For example, one or more object classes can be selected using a design modeling software application, such as IBM Rational Software Architect, by pointing and clicking, or dragging, to select a number of object classes in a UML diagram display. Implementation of this selection functionality can be simplified through the use of a plug-in architecture for design quality analysis.

At process block 1030, one or more quality metrics are calculated for the selected object classes to represent the prospective quality of source code produced according to the UML representation. As discussed above, the instructions for calculating quality metrics can be implemented as an application plug-in. The quality metrics include those discussed above regarding process block 920.

At process block 1040, a number of quality metrics are displayed using, for example, an HTML file or text file, or by using GUI functionality of a UML-editing application. By using a UML-editing application, more direct feedback is provided to a software designer, who can modify class representations as necessary to address quality metric issues indicated in a GUI window.

At process block 1050, one or more object classes are modified based on the quality metrics, in order to reduce or completely eliminate quality metric scores for a respective object class. For example, remote methods can be converted to local methods, or the inheritance depth of an object can be reduced, in order to improve the calculated quality metric.

At process block 1060, a determination of whether the class representation is of high enough quality to begin source coding is made. This determination can be made based on the calculated quality metrics being below a pre-selected threshold, or based on the judgment of a software designer. In some examples, the determination also takes into account the overall size and complexity of a class representation. For example, larger and/or more complex class representations may have higher (worse) quality metric scores but still be determined to be ready for coding. If a determination is made that the representation is not ready for coding, the method returns to process block 1030, in order to recalculate the quality metrics and re-modify the class representation until a level of quality is met. If a determination is made that the class representation is ready for coding, the method proceeds to process block 1070.

At process block 1070, source code is generated based on the UML representation modified at process block 1050. In some examples, the source code is manually produced by a human programmer, who uses the modified UML representation as a template for producing detailed source code. In some examples, skeleton code describing external methods and attributes (e.g., interface parameters) for the object classes in the representation can be automatically generated as a starting point for source coding.

At process block 1080, computer-executable instructions based on the source code are generated using, for example, a compiler or an interpreter. Therefore, by using the quality metrics at process blocks 1030-1050 as indicators of prospective source code quality, the source code and object code produced for implementing a software application can have improved defect rates and lower maintenance costs.

FIG. 12A illustrates a number of violations reported for a software project that did not use an embodiment of the techniques for early design quality analysis disclosed herein. As shown, for each class name (e.g., class names 1210, 1212, and 1214), a number of class level (e.g., eleven class level violations 1216 for the CheckingAccount class) and method level violations (e.g., six class level violations 1218 for the CheckingAccount class) are reported. Violations that exceed a pre-selected threshold are highlighted (e.g., seventeen CBO violations 1220 and fifty-six RFC violations 1222).

FIG. 12B illustrates a number of violations reported for an identical software project using an embodiment of the techniques for early design quality analysis disclosed herein. As shown, the number of violations is reduced substantially across a number of metrics. For example, the CBO violations for the SavingAccount class are reduced to twelve 1260 from seventeen 1220, and the RFC violations for the SavingAccount class are reduced to fifty-two 1262 from fifty-six 1222. It should also be noted that the metrics are not limited to those applicable at a class representation level, but also include code-level metrics, for example C_LOC (class lines of code), which also shows a reduction (e.g., from two hundred twelve C_LOC 1270 to two hundred C_LOC 1272). Thus, the quality of source code can be improved using embodiments of the disclosed techniques.

Figure 11:
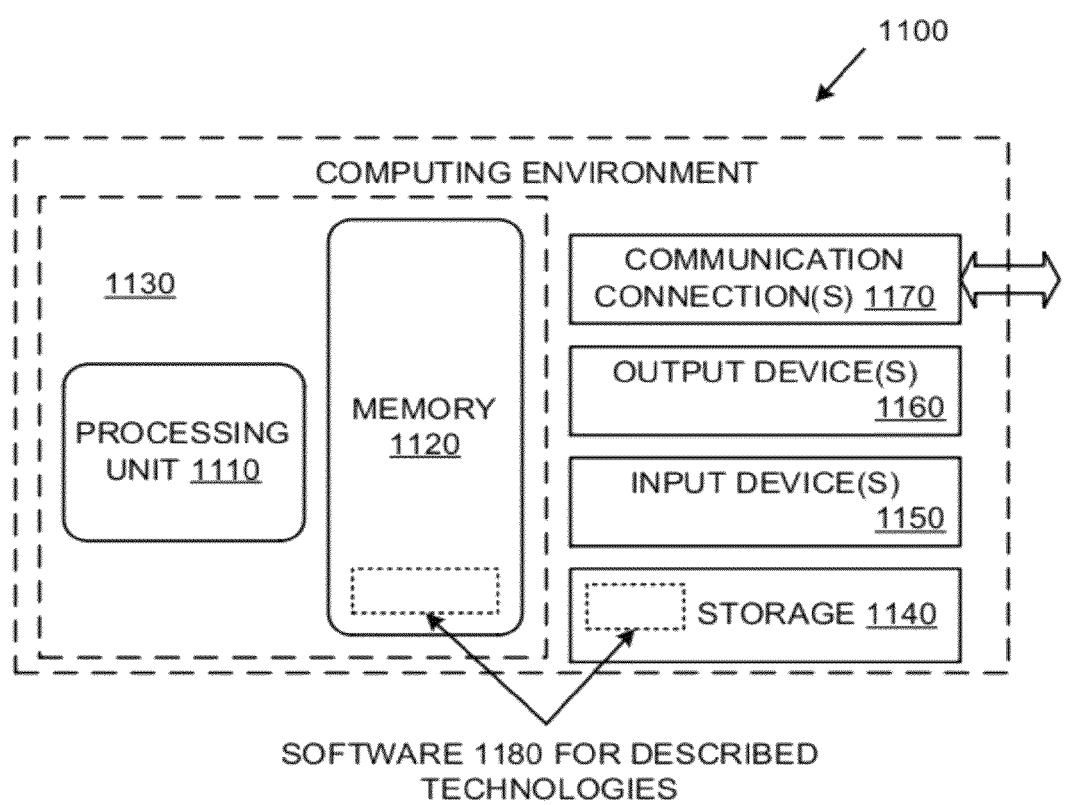
FIG. 11 illustrates a generalized example of a suitable computing environment in which described embodiments, techniques, and technologies can be implemented.

FIG. 11 illustrates a generalized example of a computing environment 1100 in which embodiments of the disclosed technology can be implemented. The computing environment 1100 includes at least one central processing unit 1110 and memory 1120. In FIG. 11, this most basic configuration 1130 is included within a dashed line. The central processing unit 1110 executes computer-executable instructions and can be a real or a virtual processor. In a multi-processing system, multiple processing units execute computer-executable instructions to increase processing power and as such, multiple processors can be running simultaneously. The memory 1120 can be volatile memory (e.g., registers, cache, RAM), non-volatile memory (e.g., ROM, EEPROM, flash memory, etc.), or some combination of the two. The memory 1120 stores software 1180 that can, for example, implement the technologies described herein. A computing environment may have additional features. For example, the computing environment 1100 includes storage 1140, one or more input devices 1150, one or more output devices 1160, and one or more communication connections 1170. An interconnection mechanism (not shown) such as a bus, a controller, or a network, interconnects the components of the computing environment 1100. Typically, operating system software (not shown) provides an operating environment for other software executing in the computing environment 1100, and coordinates activities of the components of the computing environment 1100.

The storage 1140 may be removable or non-removable, and includes magnetic disks, magnetic tapes or cassettes, CD-ROMs, CD-RWs, DVDs, or any other non-transitory storage medium which can be used to store information and that can be accessed within the computing environment 1100. The storage 1140 stores instructions for the software 1180, which can implement technologies described herein.

The input device(s) 1150 can be a touch input device, such as a touch screen, keyboard, keypad, mouse, pen, or trackball, a voice input device, a scanning device, proximity sensor, image-capture device, or another device, that provides input to the computing environment 1100. For audio, the input device(s) 1150 can be a sound card or similar device that accepts audio input in analog or digital form. The output device(s) 1160 can be a display, touch screen, printer, speaker, CD-writer, or another device that provides output from the computing environment 1100. For example, a display device can be used to display any of the GUIs shown or described herein.

The communication connection(s) 1170 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 1100. By way of example, and not limitation, with the computing environment 1100, computer-readable media include memory 1120 and/or storage 1140. As should be readily understood, the term computer-readable storage media includes non-transitory storage media for data storage such as memory 1120 and storage 1140, and not transmission media such as modulated data signals.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims and their equivalents.

We claim:

1. A method of automatically reporting quality metrics for a class-level representation of a software application, the method comprising:
   receiving the class-level representation of the software application, the class-level representation defining a graph including one or more object classes;
   selecting, using a computer, one or more of the object classes;
   calculating, using the computer, a plurality of software application quality metrics for each of the selected object classes indicative of prospective quality of the software application, the software application based on prospective source code produced in accordance with the class-level representation, wherein:
      the calculating of the software application quality metrics takes place prior to generating the source code, wherein the calculating does not use source code based on the class-level representation or source code based on the object classes; and
      for each respective class of the selected object classes, at least a first quality metric of the software application quality metrics is based on properties associated with the respective class, and at least a second quality metric of the software application quality metrics is based on relationships between the respective class and one or more other classes determined at the time of the calculating;
   comparing at least one numeric value for the first and second software application quality metrics with a threshold value;
   outputting a report, the report including data indicating at least one numeric value for the calculated plurality of quality metrics for the selected object classes, and the data providing at least one indication of a non-compliant metric of the calculated plurality of quality metrics within the report, if the plurality of software application quality metrics is above the threshold value during the comparing; and
   modifying the class-level representation of the software application to transform the non-compliant metric to a compliant metric.

2. The method of claim 1, comprising:
   applying one of mean, median or standard deviation during the calculating of the one or more quality metrics.

3. The method of claim 2, wherein the metrics for each respective class of the selected object classes are based on data that includes at least one or more of the following: a number of operations associated with the respective class, a number of attributes associated with the respective class, a number of constructors associated with the respective class, a number of overridden methods associated with the respective class, or a number of added methods associated with the respective class.

4. The method of claim 1, wherein for each respective class of the selected object classes, the metrics are based on relationships between the respective class and at least one other of the object classes.

5. The method of claim 4, wherein the metrics for each respective class of the selected object classes are based on data that includes at least one or more of the following: a depth of inheritance of the respective class, a measure of coupling between the object and the other object class, a number of responses per class for the respective class, or the number of remote methods associated with the respective class.

6. The method of claim 1, wherein the metrics include a metric based on a count of the number of reference types that are used in attribute declarations, formal parameters, return types, throw declarations and local variables, and types from which attribute and method selections are made.

7. The method of claim 1, wherein the metrics are weighted based on a whether a method is located at an object at a remote class.

8. One or more computer-readable storage media storing computer-readable instructions that when executed by a computer cause the computer to perform the method of claim 1.

9. A method of applying one or more software application quality metrics to one or more UML diagrams for a class-level representation of a software application, the method comprising:
receiving the UML diagrams, the diagrams including one or more object classes;
selecting, using a computer, one or more of the object classes;
calculating, using the computer, at least one numeric value representing the one or more software application quality metrics for the selected one or more of the object classes, the one or more software application quality metrics indicative of prospective quality of source code produced in accordance with the class-level representation, wherein:
the calculating of the at least one numeric value takes place independently of the produced source code, wherein the calculating does not use source code based on the class-level representation or source code based on the objects;
the at least one numeric value indicates one of compliance or non-compliance of a corresponding one of the software application quality metrics with a pre-determined threshold value; and
for each respective class of the selected one or more object classes, at least a first one of the software application quality metrics is based on properties associated with the respective class, and at least a second one of the software application quality metrics is based on relationships between the respective class and one or more other classes determined at the time of the calculating;
comparing the at least one numeric value for the first and second software application quality metrics with the pre-determined threshold value;
outputting a report, the report including data indicating the at least one numeric value representing the one or more software application quality metrics for the selected one or more object classes, and the data providing at least one indication of a non-compliant metric of the calculated plurality of quality metrics within the report, if the plurality of software application quality metrics is above the pre-determined threshold value during the comparing; and
modifying, using a graphical user interface (GUI) tool, at least one of the object classes of the UML diagrams to transform the non-compliant metric to a compliant metric.

10. The method of claim 9, wherein the modifying comprises adding two or more subclasses for at least one of the object classes based on a NOOM metric.

11. The method of claim 9, wherein the modifying comprises, for at least one of the object classes, removing an overridden method of the at least one object class and extending the functionality of a parent class of the at least one object class to provide the functionality of the overridden method based on a NOOM metric.

12. The method of claim 9, further comprising:
selecting the selected object classes using the GUI tool; and
coding source code, the source code based at least in part on the updated object classes.

13. The method of claim 12, further comprising producing computer-readable instructions based on the source code.

14. The method of claim 9, further comprising displaying a representation of at least one of the object classes using a GUI tool, wherein the selected object classes are selected using the GUI tool, and wherein the calculating is initiated using the GUI tool.

15. The method of claim 9, further comprising displaying a representation of the object classes using a GUI of an application for editing the UML diagrams using the GUI, wherein the selected object classes are selected using the GUI.

16. The method of claim 9, further comprising reading one or more computer-readable instructions from one or more computer-readable storage media, wherein:
at least one of the receiving, the calculating, or the modifying is performed at least in part using the computer-readable instructions; and
the computer-readable instructions are executable by an application for editing UML diagrams of software applications using a GUI tool, at least a portion of the computer-readable instructions being loaded by the application as a plug-in.

17. One or more computer-readable storage media storing computer-readable instructions that when executed by a computer, cause the computer to perform the method of claim 9.

18. A computing system, comprising:
one or more processors;
one or more input devices;
one or more output devices; and
one or more computer-readable storage media storing computer-executable instructions, the computer-executable instructions comprising:
instructions for loading a class-level representation of a software application, the class-level representation defining one or more object classes, and
instructions for selecting one or more of the object classes and calculating for each selected object class, at least one numeric value representing one or more software application quality metrics for the selected object classes, the one or more software application quality metrics indicative of prospective quality of source code produced in accordance with the class-level representation, wherein:
the calculating of the at least one numeric value representing the software application quality metrics is based on one or more of the object classes and takes place without generating the source code;

instructions for displaying the at least one numeric value representing the software application quality metrics, wherein:
- the at least one numeric value indicates one of compliance or non-compliance of a corresponding one of the software application quality metrics with a pre-determined threshold value;
- for a respective class of the selected one or more object classes, at least one of the software application quality metrics is based on properties associated with the respective class and/or relationships between the respective class and one or more other classes determined at the time of the calculating;
- comparing the at least one numeric value for the at least one of the software application quality metrics with the pre-determined threshold value; and
- display of a complaint one of the at least one numeric value is visually different from a display of a non-compliant one of the at least one numeric value; and instructions for modifying the class-level representation of the software application to transform the non-compliant metric to a compliant metric.

19. The system of claim 18, wherein the computer-executable instructions further comprise instructions for providing a plug-in interface allowing an application for editing class-level representations of software applications to access functionality provided by the computer-executable instructions without recompilation of the application.

\* \* \* \* \*